(12) United States Patent
Shah et al.

(10) Patent No.: US 7,716,523 B2
(45) Date of Patent: May 11, 2010

(54) END-TO-END TRANSACTIONAL PROTECTION FOR REQUESTS IN A WEB APPLICATION

(75) Inventors: Veeral Shah, Mumbai (IN); Rolland Crunk, Fremont, CA (US); Lior Abraham, Mt. View, CA (US); Harshad Toke, Pune (IN); Cuong Tran, Los Altos, CA (US)

(73) Assignee: Symantec Corporation, Mountain View, CA (US)

( * ) Notice: Subject to any disclaimer, the term of this patent is extended or adjusted under 35 U.S.C. 154(b) by 539 days.

(21) Appl. No.: 11/744,040

(22) Filed: May 3, 2007

(65) Prior Publication Data

US 2008/0276117 A1   Nov. 6, 2008

(51) Int. Cl.
 *G06F 11/00* (2006.01)
(52) U.S. Cl. .......................................... 714/15; 714/4
(58) Field of Classification Search ............... 714/15, 714/4, 16, 18, 37, 38; 709/233, 244
See application file for complete search history.

(56) References Cited

U.S. PATENT DOCUMENTS

| | | | |
|---|---|---|---|
| 4,872,256 A | 10/1989 | Plumer | |
| 6,308,282 B1 * | 10/2001 | Huang et al. | 714/4 |
| 6,618,817 B1 * | 9/2003 | Armstrong | 714/4 |
| 6,760,861 B2 * | 7/2004 | Fukuhara et al. | 714/4 |
| 7,111,035 B2 * | 9/2006 | McClellan et al. | 709/201 |
| 7,203,863 B2 | 4/2007 | Pavlik | |
| 7,251,745 B2 | 7/2007 | Koch | |
| 7,451,347 B2 | 11/2008 | Subbaraman | |
| 7,454,422 B2 | 11/2008 | Chan | |
| 7,464,151 B1 | 12/2008 | Drennen | |
| 2007/0043726 A1 * | 2/2007 | Chan et al. | 707/9 |

OTHER PUBLICATIONS

"Efficient TCP Connection Failover in Web Server Clusters," Zhang et al., Mar. 2004, http://www.cs.virginia.edu/papers/26_2.PDF.

* cited by examiner

*Primary Examiner*—Dieu-Minh Le
(74) *Attorney, Agent, or Firm*—Meyertons, Hood, Kivlin, Kowert & Goetzel, P.C.; Jason L. Burgess

(57) ABSTRACT

Various embodiments of a system and method for processing a request in a distributed software application are disclosed. In response to a client request, one or more server computers may modify a plurality of different portions of state information. The system may operate to ensure that the portions of state information are all modified atomically. The system may also operate to provide transparent connection failover functionality for the network connection between the client computer and the one or more server computers.

21 Claims, 10 Drawing Sheets

END-TO-END TRANSACTIONAL PROTECTION FOR REQUESTS IN A WEB APPLICATION

BACKGROUND OF THE INVENTION

1. Field of the Invention

This invention relates generally to web applications, e.g., distributed software applications in which a client computer executes web browser software to interact with one or more server computers.

2. Description of the Related Art

In a web application a client computer executes web browser software to communicate with one or more server computers. The server computer(s) may modify state information based on requests received from the web browser. For example, in many web applications, a web server computer receives a request from a web browser and forwards the request[LA1] to application software, e.g., where the application software may execute on the web server computer or on one or more separate application server computers. The application software may then modify state information in response to the request, such as application data, session data, or other types of state information.

In many web applications, the application software is implemented according to an N-tier architecture, e.g., where the application software is organized into multiple tiers. For example, the software in each tier may be implemented as components which are separate from components in other tiers. This may enable different aspects of the application to be largely isolated from each other. For example, many web applications utilize a 3-tier architecture including a presentation tier, application tier, and data tier. The software in different tiers may execute on the same application server as each other or may execute on different application servers.

Each tier may maintain its own state information, which may be modified in response to client requests. For example, software in the presentation tier may maintain state information related to communication sessions, software in the application tier may maintain state information related to application logic objects, and software in the data tier may maintain state information related to application data. The state information of each respective tier may be created and stored separately from the state information of other tiers. For example, the presentation tier state information and application tier state information may each be stored in different data structures in dynamic memory[LA2], and the tier state information may be stored in a database.

In some web applications, state information may be replicated across different application servers. For example, a web application may respond to a request by modifying state information on both a primary application server and a secondary application server, e.g., where each application server maintains a copy of the state information.

Data coherency problems may arise if a failure occurs while a client request is being processed. For example, if the application server fails after the state information in the presentation and application tiers is modified but before the state information in the data tier is modified then the state information in the data tier may be incoherent with respect to the state information in the other tiers.

As another example, if some or all of the state information is replicated across different application servers then a failure while processing the client request may result in the respective copies of the state information being incoherent with each other, e.g., if the failure results in the state information being modified on a subset, but not all, of the application servers.

As another example, if the state information in all the tiers is successfully modified, but the web server fails before a response is returned to the client computer then the user of the client computer may not know whether the request was successfully performed or not. Thus, the user may be forced to submit the request a second time. This may be particularly problematic for non-idempotent requests, e.g., requests that produce different results when processed multiple times. Also, if the web server fails then the user of the client computer may see an error page indicating that the network connection to the web server failed, which is undesirable in many applications.

SUMMARY

Various embodiments of a system and method for processing a request in a distributed software application are disclosed herein, e.g., where the request is received from a client computer and processed by one or more server computers. In some embodiments the system may include a first set of one or more server computers operable to execute a first instance of request management software, a first instance of transaction management software, and a first instance of application software.

The first instance of request management software may be executable to receive a request from a client computer and forward the request to the first instance of transaction management software. The first instance of transaction management software may be executable to coordinate a transaction in response to the request.

Coordinating the transaction may comprise forwarding the request to the first instance of application software. The first instance of application software may include a first plurality of executable software components which each maintain a respective portion of state information. Each of the software components may be executable to store a respective portion of change information in response to the request.

Coordinating the transaction may also comprise initiating a commit operation according to a commit protocol. The first plurality of software components and the first instance of request management software may act as participants in the commit operation. The commit protocol may enable the first plurality of software components to attempt to atomically commit their respective portions of change information to their corresponding portions of state information and may enable the first instance of request management software to perform a selected action depending upon whether the portions of change information are successfully committed.

In a further embodiment, the system may also include a second set of one or more server computers operable to execute a second instance of the request management software. Receiving the request from the client computer may comprise receiving one or more packets associated with a network connection. The first instance of request management software may be executable to forward the packets associated with the network connection to the second instance of request management software on the second set of one or more server computers. The second instance of request management software may be executable to log the packets.

In the event of a failure of the network connection, the second instance of request management software on the second set of one or more server computers may be executable to detect the failure and take over the network connection in response to the failure. Taking over the network connection may comprise returning a response to the client computer via the network connection.

BRIEF DESCRIPTION OF THE DRAWINGS

A better understanding of the invention can be obtained when the following detailed description is considered in conjunction with the following drawings, in which.

Figure 1:
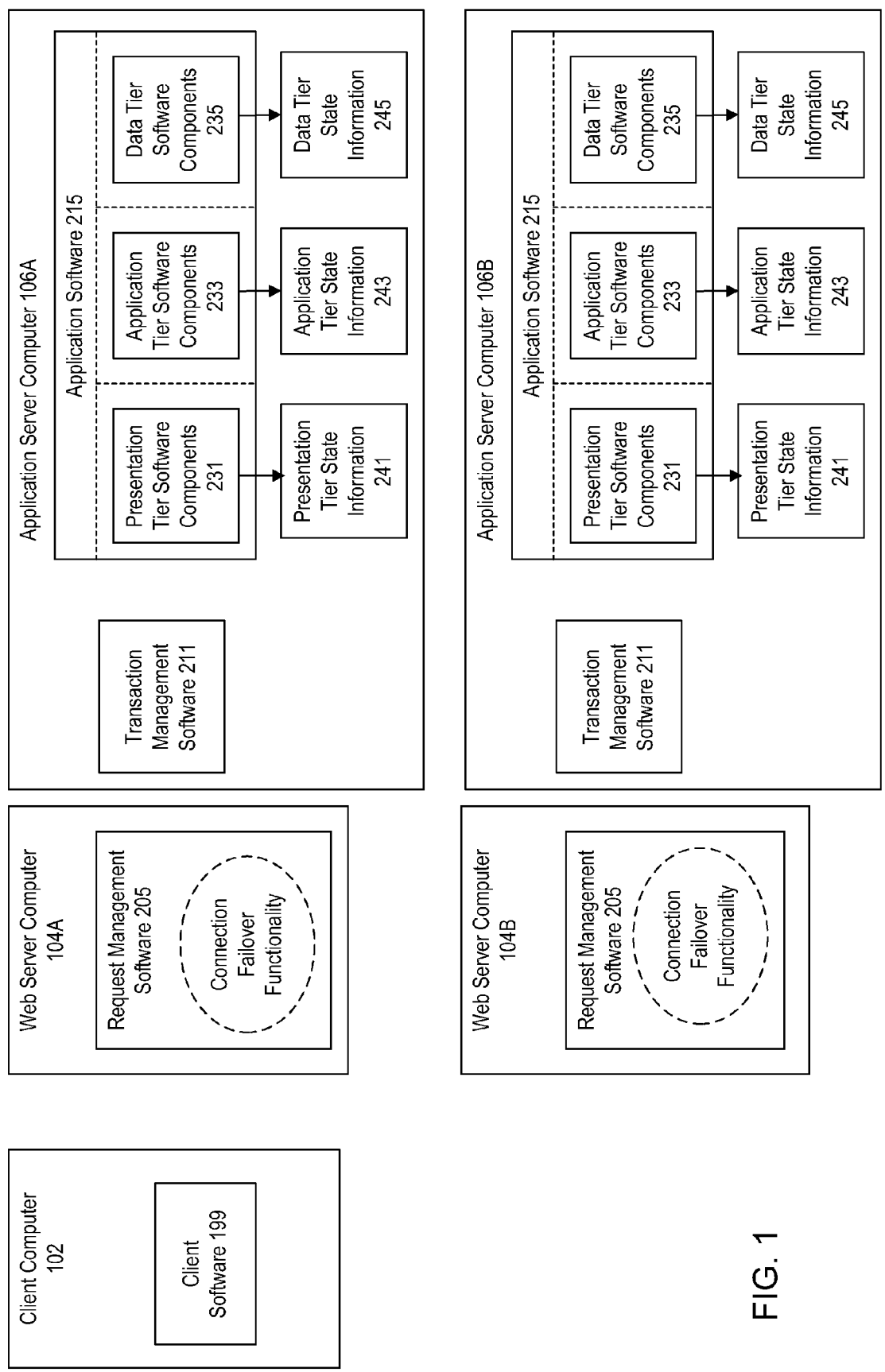
FIG. 1 illustrates one embodiment of a system for processing a request in a distributed software application.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for processing a request in a distributed software application are disclosed herein, e.g., where the request is received from a client computer and processed by one or more server computers. In some embodiments the system and method may be used in a web application, e.g., an application in which a client computer executes web browser software to interact with one or more server computers.

In response to a client request, the one or more server computers may modify a plurality of different portions of state information. The system may operate to ensure that the portions of state information are all modified atomically. For example, the system may operate to coordinate a transaction which ensures that either all of the portions of state information are modified or none of the portions of state information are modified. This may enable the portions of state information to remain coherent with each other even in the event of a failure on one of the server computers.

The system may also operate to provide transparent connection failover functionality for the network connection between the client computer and the one or more server computers. For example, in some embodiments, a TCP connection or other type of network connection may be established between the client computer and a web server computer when the client computer submits the request. In the event of a failure of the web server while the TCP connection is still open, e.g., a failure of the web server before a response to the request is returned to the client computer, the system may automatically failover the request to another web server computer. The other web server computer may take over the TCP connection and return a response to the request to the client computer. The connection failover may be performed transparently to the client computer, e.g., so that the user of the client computer does not see a connection error.

FIG. 1 illustrates one embodiment of the system. In this example, the system includes two web server computers 104 and two application server computers 106. It is noted that throughout this disclosure, drawing features identified by the same reference number followed by a letter (e.g., web server computers 104A and 104B) may be collectively referred to by that reference number alone (e.g., web server computers 104) where appropriate.

In other embodiments there may be other numbers of web server computers 104 and/or application server computers 106. For example, the system may include more than two web server computers 104. The system may also include more than two application server computers 106, or in some embodiments may utilize only a single application server computer 106. Also, in some embodiments the functionality of a web server computer 104 and an application server computer 106 may be combined. For example, in one alternative embodiment of the system illustrated in FIG. 1, the system may include two server computers, where one server computer performs the functions of the web server computer 104A and the application server 106A and the other server computer performs the functions of the web server computer 104B and the application server 106B.

The system also includes a client computer 102, which executes client software 199. In various embodiments the client software 199 may comprise any kind of application operable to perform network communication. In some embodiments the client software 199 may comprise web browser software, e.g., software operable to connect to Internet web sites.

In response to the user of the client computer 102 interacting with the client software 199, the client computer 102 may connect to one of the web server computers 104 and send a request to the web server computer 104. For example, the client computer 102 may be coupled to the web server computer 104 via a network, and a TCP connection or other type of network connection may be established between the client computer 102 and the web server computer 104. The request may be sent to the web server computer 104 as one or more packets via the TCP connection.

In this example, suppose that the request is sent from the client computer 102 to the web server computer 104A. Request management software 205 executing on the web server computer 104A may receive the request and forward the request to one or more of the application server computers 106, e.g., the application server computer 106A. Transaction management software 211 executing on the application server computer 106A may receive the request. The transaction management software 211 may forward the request to application software 215 executing on the application server computer 106A and may also coordinate a transaction in response to the request.

For example, the application software 215 on the application server computer 106A may include a plurality of executable software components which each maintain a respective portion of state information. Each of the software components may be executable to store a respective portion of change information in response to the request, e.g., where the change information indicates a change to be made to the respective portion of state information. The transaction management software 211 may coordinate a transaction which ensures that either all of the portions of change information are committed or applied to the respective portions of state information or none of the portions of change information are committed. The transaction may also ensure that the request management software 205 on the web server computer 104A performs a selected action depending upon whether the portions of change information are successfully committed.

For example, the transaction coordinated by the transaction management software 211 may utilize a two-phase commit (2PC) protocol or other commit protocol to perform an atomic commit operation, where each of the software components that stores a portion of change information in response to the request acts as a participant in the commit operation. This may ensure that the portions of change information are all committed atomically if the commit operation is successful. In other words, the commit operation may ensure that either all the portions of state information are updated according to the respective portions of change information, or none of the portions of state information are updated. If the commit operation is not successful then the transaction management software 211 may cause the portions of change information to be discarded.

The request management software 205 on the web server computer 104A may also act as a participant in the commit operation. The commit operation may ensure that the request management software 205 performs an appropriate action depending upon whether the portions of change information are successfully committed. For example, in some embodiments the commit operation may ensure that the request management software 205 returns a response to the request to the client computer 102 if the portions of change information are successfully committed, e.g., where the response indicates that the request was successful. For example, the response may be returned to the client computer 102 as part of a successful commit operation based on the commit protocol. In some embodiments the request management software 205 may receive response information from the application software 215 when the application software 215 processes the request, and the request management software 205 may send the response information in the response to the client computer 102.

If however, the commit operation is not successful, e.g., if the portions of change information are not successfully committed, then the request management software 205 may perform an action other than returning a response indicating success[LA3]. For example, in some embodiments the request management software 205 may re-submit the request, e.g., by forwarding it again to the transaction management software 211 on the application server computer 106A or to the transaction management software 211 on the application server computer 106B. Even non-idempotent requests may be safely re-submitted since none of the portions of change information are committed if the commit operation is not successful. In other embodiments the request management software 205 may return a response to the client computer 102 indicating that the request was not performed successfully instead of automatically re-submitting the request. In this case, the user of the client computer 102 may interact with the web browser software to re-submit the request if desired. Again, even a non-idempotent request can be safely re-submitted.

In the example of FIG. 1, the application software 215 is organized into three tiers: a presentation tier, an application tier, and a data tier. The presentation tier includes one or more presentation tier software components 231. The presentation tier software components 231 may be operable to perform logic associated with presentation of information to the client computer 102. One or more of the presentation tier software components 231 may maintain presentation tier state information 241. The presentation tier state information 241 may comprise any of various kinds of state information that needs to be maintained or used by the presentation tier software components 231. For example, in some embodiments the presentation tier state information 241 may include HTTP session information. In some embodiments the presentation tier state information 241 may be stored in volatile memory, e.g., RAM, of the application server computer 106A. In other embodiments the presentation tier state information 241 may be stored in non-volatile memory, e.g., on a hard disk, of the application server computer 106A.

The application tier includes one or more application tier software components 233. The application tier software components 233 may be operable to perform business logic or application logic. One or more of the application tier software components 233 may maintain application tier state information 243. The application tier state information 243 may comprise any of various kinds of state information that needs to be maintained or used by the application tier software components 233. For example, in some embodiments one or more of the application tier software components 233 may be implemented as Enterprise JavaBean (EJB) components, and the application tier state information 243 may include session bean information. In some embodiments the application tier state information 243 may be stored in volatile memory, e.g., RAM, of the application server computer 106A. In other embodiments the application tier state information 243 may be stored in non-volatile memory, e.g., on a hard disk, of the application server computer 106A.

The data tier includes one or more data tier software components 235. The data tier software components 235 may be operable to perform logic for storing application data, e.g., as data tier state information 245. In some embodiments the data tier software components 235 may implement a relational database or other type of database. For example, the data tier state information 245 may be stored in the database. In some embodiments the data tier state information 245 may be stored in non-volatile memory, e.g., on a hard disk, of the application server computer 106A. In other embodiments the data tier state information 245 may be stored in volatile memory, e.g., RAM, of the application server computer 106A. In other embodiments the data tier state information 245 may be stored on a separate computer system from the application server computer 106A.

In response to the transaction management software 211 forwarding the request to the application software 215, the presentation tier software components 231 may be operable process the request and generate a first portion of change information, e.g., where the first portion of change information indicates a change that needs to be made to presentation tier state information 241 in response to the request. However, the presentation tier state information 241 may not yet be changed. For example, the first portion of change information may be stored separately from the presentation tier state information 241. In some embodiments the first portion of change information may indicate how the presentation tier state information 241 can be modified in order to produce updated presentation tier state information 241. In other embodiments the first portion of change information may comprise a copy of the presentation tier state information 241, where the copy has already been modified according to the request.

Similarly, the application tier software components 233 may be operable process the request and generate a second portion of change information, e.g., where the second portion of change information indicates a change that needs to be made to application tier state information 243 in response to the request. The second portion of change information may be stored separately from the application tier state information 243, e.g., may not yet be applied to the application tier state information 243.

Similarly, the data tier software components 235 may be operable process the request and generate a third portion of change information, e.g., where the third portion of change information indicates a change that needs to be made to data tier state information 245 in response to the request. The third portion of change information may be stored separately from the data tier state information 245, e.g., may not yet be applied to the data tier state information 245.

The presentation tier software components 231, application tier software components 233, and data tier software components 235 may participate in the commit operation initiated by the transaction management software 211. For example, the commit operation may cause the first portion of change information to be committed to the presentation tier state information 241. Committing the first portion of change information may comprise modifying the presentation tier state information 241 according to the change information. For example, where the change information specifies modifications to be made to the presentation tier state information 241, the modifications may be performed in order to modify the presentation tier state information 241. As another example, where the first portion of change information comprises a modified copy of the presentation tier state information 241, the presentation tier state information 241 may be replaced with the modified copy.

Similarly, the commit operation may cause the second portion of change information to be committed to the application tier state information 243 and the third portion of change information to be committed to the data tier state information 245. The respective portions of change information may be committed atomically. For example, the presentation tier software components 231, application tier software components 233, and data tier software components 235 may communicate with each other and/or with the transaction management software 211 in multiple phases, e.g., according to a two-phase commit protocol or other commit protocol, so that either all of the various portions of state information (241, 243, and 245) are modified or none of the portions of state information are modified.

The architecture of the application software 215 in FIG. 1 is intended to illustrate one example. In other embodiments the application software 215 may be organized into a different number of tiers or different types of tiers. Also, in other embodiments any of various other types of state information may be updated in the transaction.

In some embodiments, state information on multiple application server computers 106 may be updated in response to the request from the client computer 102. For example, state information may be replicated across multiple application server computers for backup purposes. In the example of FIG. 1, the application server computer 106B executes another instance of the application software 215. In some embodiments, in addition to forwarding the request to the application software 215 executing on the application server computer 106A, the transaction management software 211 may also forward the request to the application software 215 executing on the application server computer 106B.

The application software 215 on the application server computer 106B may respond to the request similarly as described above with reference to the application software 215 on the application server computer 106A. For example, each of the various types of software components (231, 233, and 235) may store a respective portion of change information.

The presentation tier software components 231, application tier software components 233, and data tier software components 235 on the application server computer 106B may also participate along with the software components on the application server computer 106A in the commit operation initiated by the transaction management software 211. Thus, the portions of change information stored by the software components (231, 233, and 235) on the application server computer 106A and the portions of change information stored by the software components (231, 233, and 235) on the application server computer 106B may all be [LA4]committed atomically if the commit operation is successful, or none of the portions of change information may be committed on either application server computer 106 if the commit operation is unsuccessful.

In the embodiment illustrated in FIG. 1, the request management software 205 also implements connection failover functionality, e.g., for transparent failover of the TCP connection or other network connection between the client computer 102 and the web server computer 104A in response to a failure of the connection. For example, the TCP connection failure may be caused by a failure of the web server computer 104A before a response to the request is returned to the client computer 102.

In response to the TCP connection failure, request management software 205 on the web server computer 104B may take over the TCP connection. For example, before the TCP connection failure, the instance of the request management software 205 on the web server computer 104A may receive one or more data packets associated with the TCP connection and forward the packets to the instance of the request management software 205 on the web server computer 104B. In response to receiving the packets, the request management software 205 on the web server computer 104B may log the packets, e.g., may store the packets.

In the event of a failure of the TCP connection, e.g., due to a failure of the web server computer 104A, the request management software 205 on the web server computer 104B may detect the failure. For example, the request management software 205 may detect that the web server computer 104A has failed or may be notified of the failure by other software. In response to the failure, the request management software 205 on the web server computer 104B may take over the TCP connection between the client computer 102 and the web server computer 104A.

In some embodiments, taking over the TCP connection may include the request management software 205 on the web server computer 104B returning a response to the client computer 102 via the TCP connection or ensuring that a response is returned to the client computer 102 via the TCP connection. For example, the packets associated with the TCP connection that were logged may be utilized to take over the TCP connection. This failover functionality may ensure that the user of the client computer 102 does not see an error due to a failure of the TCP connection. Thus, the connection failover to the web server computer 104B may be transparent to the user.

As discussed above, the transaction management software 211 on the web server computer 104A may coordinate a transaction in response to the request, where this includes performing a commit operation using a 2PC commit protocol or other commit protocol such that a successful commit operation requires the request management software 205 on the web server computer 104A to return a response to the request to the client computer 102, as well as requiring all of the portions of change information to be successfully committed. Thus, if the web server computer 104A fails before a response to the request is returned to the client computer 102 then the commit operation will not be successful, e.g., since the request management software 205 on the web server computer 104A cannot return a response to the client computer 102 if the web server 104A has failed.

As discussed above, if the commit operation is not successful then the portions of change information stored when the application software 215 processes the request may be discarded without applying the changes indicated by the portions of change information to the respective portions of state information. In some embodiments, the request management software 205 on the web server computer 104B may be operable to initiate re-processing of the request in response to detecting the failure of the web server computer 104A. For example, the logged TCP data packets may be used to re-create the request. The request management software 205 may, for example, send the request again to the transaction management software 211 on the web server computer 104A. In other embodiments the request management software 205 may instead send the request to the transaction management software 211 on the web server computer 104B.

The transaction management software 211 that receives the request may coordinate a new transaction to attempt to process the request, in a manner similar as described above. Thus, if the commit operation for the new transaction is performed successfully, then the various portions of state information may be committed successfully and the request management software 205 on the web server computer 104B may return a response indicating success to the client computer 102.

Figure 2:
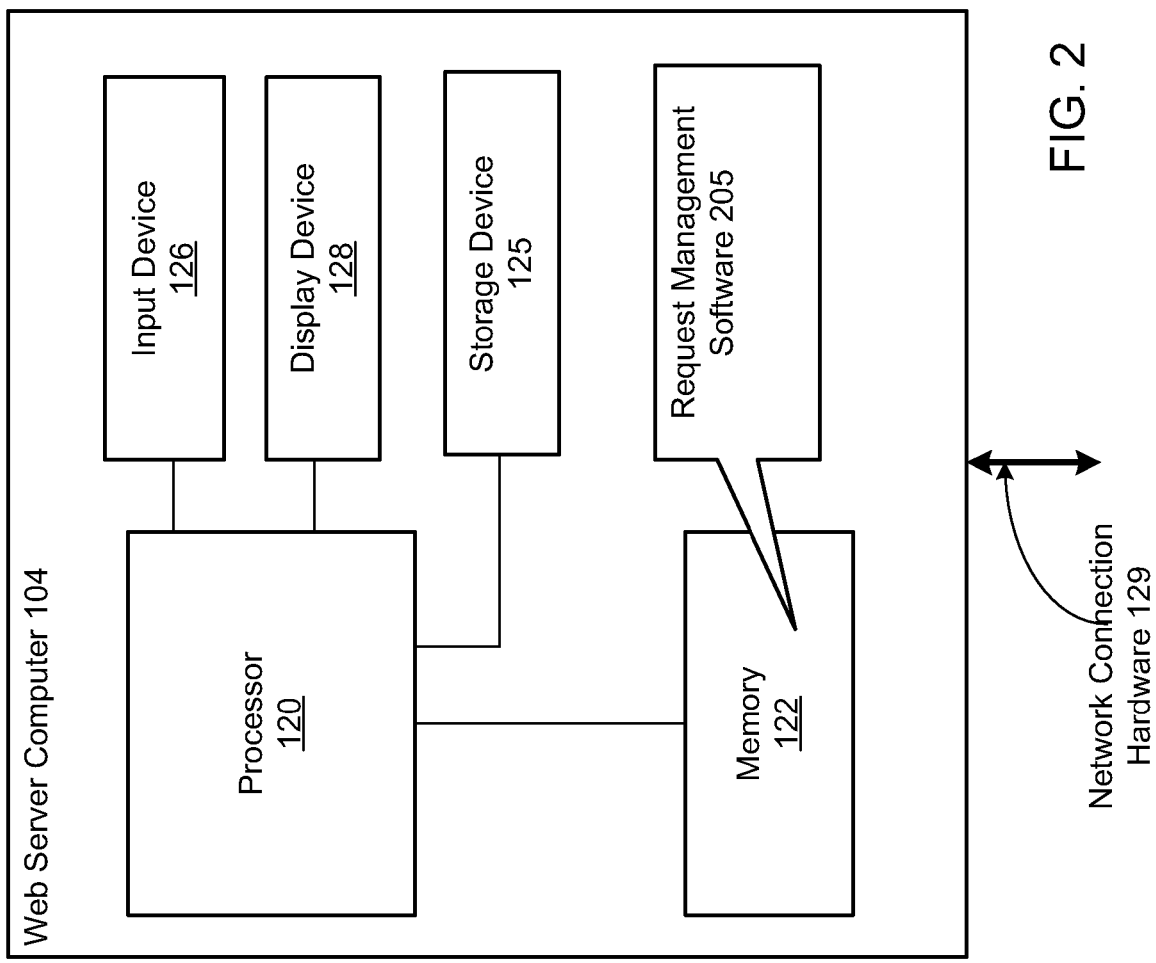
FIG. 2 illustrates an example of a web server computer in the system according to one embodiment.

FIG. 2 illustrates an example of a web server computer 104 according to one embodiment. The web server computer 104 includes a processor 120 coupled to a memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the request management software 205. The processor 120 may execute the request management software 205 to perform the functionality described above. In some embodiments the memory 122 may also store other software which the processor 120 executes in conjunction with the request management software 205, e.g., either software associated with serving web requests received from client computers 102.

It is noted that the processor 120 is representative of any type of processor. For example, in one embodiment, the processor 120 may be compatible with the x86 architecture, while in another embodiment the processor 120 may be compatible with the SPARC™ family of processors. Also, in some embodiments the web server computer 104 may include multiple processors 120.

The web server computer 104 also includes or is coupled to one or more storage devices 125. In various embodiments the storage devices 125 may include any of various kinds of storage devices operable to store data, such as optical storage devices, hard drives, tape drives, etc. As one example, the storage devices 125 may be implemented as one or more hard disks configured independently or as a disk storage system.

The web server computer 104 may also include one or more input devices 126 for receiving user input from a user of the web server computer 104. The input device(s) 126 may include any of various types of input devices, such as keyboards, keypads, microphones, or pointing devices (e.g., a mouse or trackball). The web server computer 104 may also include one or more output devices 128 for displaying output to the user. The output device(s) 128 may include any of various types of output devices, such as LCD screens or monitors, CRT monitors, etc.

The web server computer 104 may also include network connection hardware 129 through which the web server computer 104 couples to the client computer 102 and the application server computers 106. The network connection hardware 129 may include any type of hardware for coupling the web server computer 104 to a network, e.g., depending on the type of network. In various embodiments, the web server computer 104 may be coupled to the client computer 102 and the application server computers 106 via any type of network or combination of networks. For example, the network may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each computer may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Figure 3:
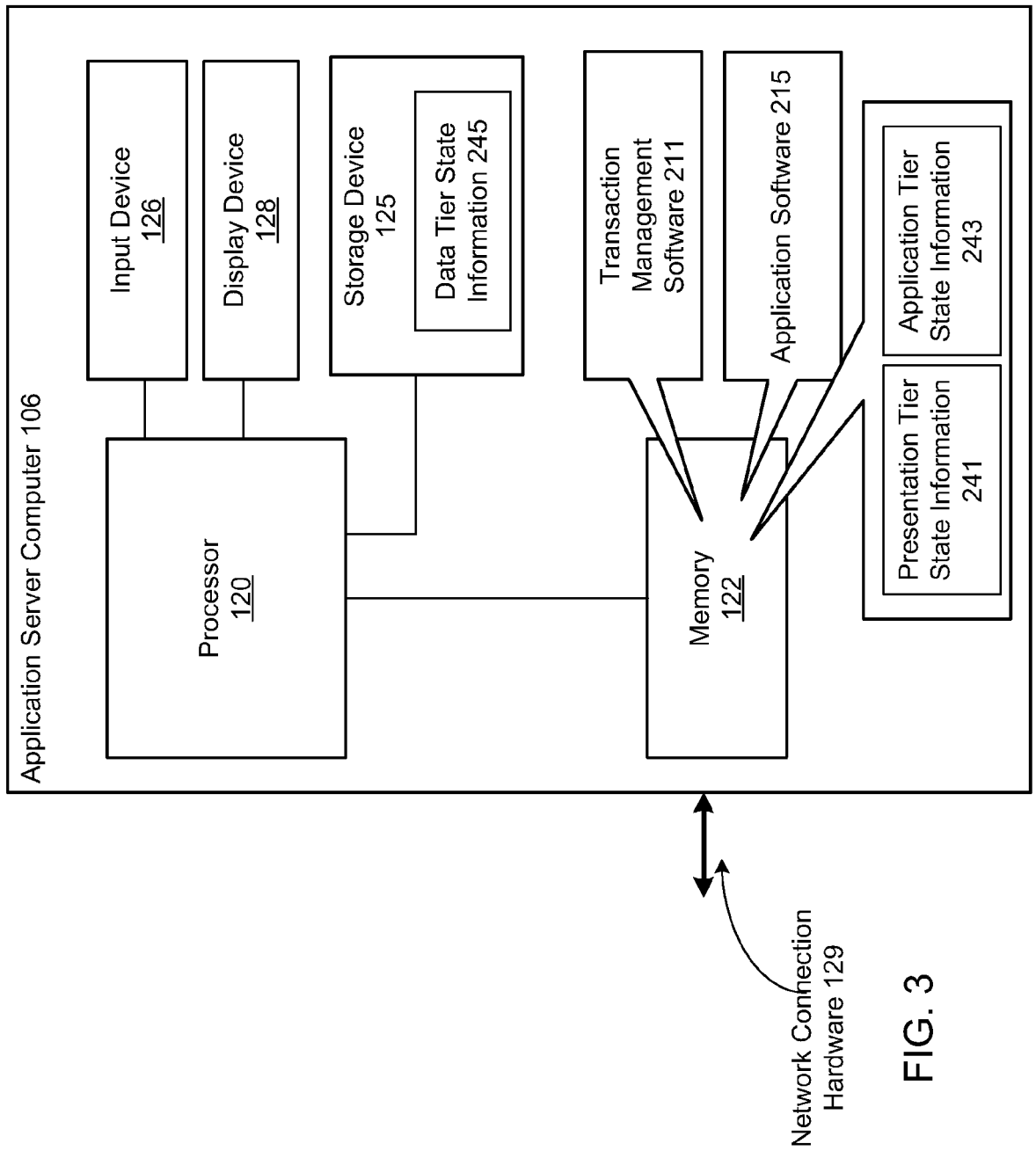
FIG. 3 illustrates an example of an application server computer in the system according to one embodiment.

FIG. 3 illustrates an example of a application server computer 106 according to one embodiment. The application server computer 106 includes a processor 120 coupled to a memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the transaction management software 211 and the application software 215. The processor 120 may execute the transaction management software 211 and the application software 215 to perform the functionality described above. In some embodiments the memory 122 may also store the presentation tier state information 241 and the application tier state information 243. In other embodiments, all of or a portion of the presentation tier state information 241 and the application tier state information 243 may be stored on the storage devices 125 of the application server computer 106.

In various embodiments the storage devices 125 may include any of various kinds of storage devices operable to store data, e.g., in a non-volatile manner, such as optical storage devices, hard drives, tape drives, etc. As one example, the storage devices 125 may be implemented as one or more hard disks configured independently or as a disk storage system. As another example, the storage devices 125 may be implemented as one or more tape drives. In some embodiments the storage devices 125 may operate in a storage system or library device with which the application server computer 106 communicates via a communication bus or network. In some embodiments the storage devices 125 may store the data tier state information 245. In other embodiments, all of or a portion of the data tier state information 245 may be stored on the memory 122 of the application server computer 106.

The application server computer 106 may also include one or more input devices 126, one or more output devices 128, and a network connection 129, similarly as described above with reference to the web server computer 104.

In various embodiments, the system may utilize any type of computing environment or software framework. For example, in some embodiments the application software 215 may be implemented as a Java 2 Platform, Enterprise Edition (J2EE) application or other Java application. In other embodiments the application software 215 may be implemented as a Microsoft .NET application or other type of application.

Figure 4:
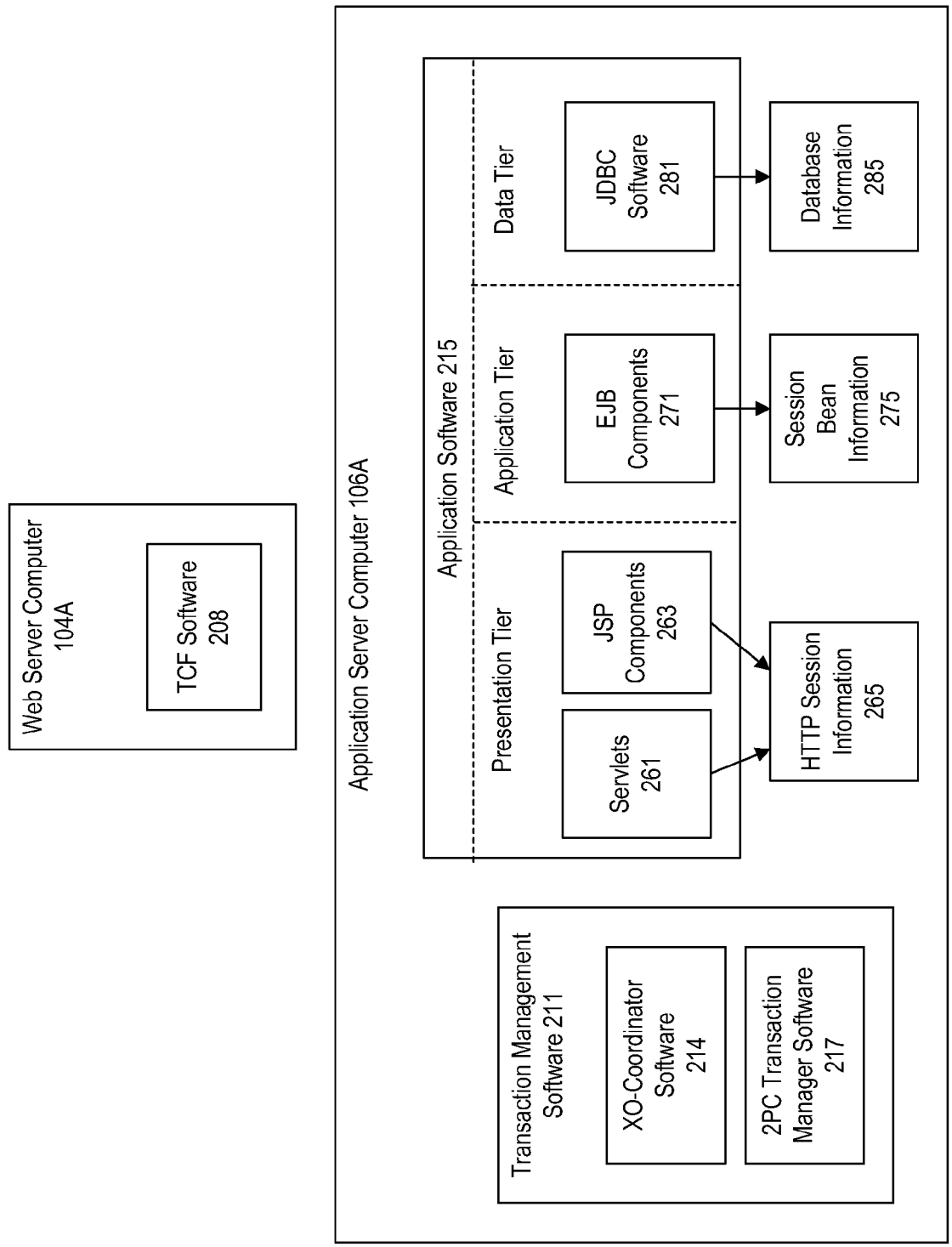
FIG. 4 illustrates an example in which application software utilized in the system is implemented as a J2EE application.

FIG. 4 illustrates an example in which the application software 215 is implemented as a J2EE application. For example, the presentation tier includes Java Servlets 261 and JavaServer Pages (JSP) components 263. The Servlets 261 and/or the JSP components 263 may maintain state information, such as HTTP session information 265. The application tier includes Enterprise JavaBean (EJB) components 271. The EJB components 271 may maintain state information, such as session bean information 275. The data tier includes Java Database Connectivity (JDBC) components 281. The JDBC components 281 may maintain state information, such as database information 285.

In the embodiment of FIG. 4, the functionality of the request management software 205 is implemented by the TCF software 208, which executes on the web server computer 104. Also, the transaction management software 211 includes XO-Coordinator software 214 and two-phase commit (2PC) transaction manager software 217.

The 2PC transaction manager software 217 may implement a transaction manager operable to manage a two-phase commit protocol. For example, in some embodiments the Java Transaction Service (JTS) software may be used as the 2PC transaction manager software 217.

The XO-Coordinator software 214 coordinates the participants in the transaction with the 2PC transaction manager software 217. For example, the XO-Coordinator software 214 may receive a client request forwarded from a web server computer 104 and communicate with the 2PC transaction manager software 217 to initiate a new transaction for processing the request. The XO-Coordinator software 214 may also register with the 2PC transaction manager software 217 the software components that will participate in the transaction, e.g., the software components that need to update state information in response to the request. In the example of FIG. 4, the XO-Coordinator software 214 may register one or more Servlets 261, one or more JSP components 263, one or more EJB components 271, and or one or more JDBC components 281 as participants in the transaction. The XO-Coordinator software 214 may also register itself as a participant on behalf of the TCF software 208.

If data for the application is replicated on multiple application server computers 106 then the XO-Coordinator software 214 may register software components for each of the application server computers 106 that need to participate in the transaction.

The XO-Coordinator software 214 may then pass the request to the application software 215, which may execute in response to the request as described above. If the application software 215 generates response information, the XO-Coordinator software 214 may receive the response information and forward it to the web server computer 104. For example, the TCF software 208 on the web server computer 104 may receive the response information and store the response information until further direction from the 2PC transaction manager software 217.

After the application software 215 has processed the request, the XO-Coordinator software 214 may request the 2PC transaction manager software 217 to commit the transaction. In response, the 2PC transaction manager software 217 may communicate with the participants in the transaction according to a 2PC protocol to cause them to commit the various portions of change information generated when the application software 215 processed the request. The XO-Coordinator software 214 may act as a proxy agent for the TCF software 208 in the commit operation. For example, if and when the transaction is successfully committed, the XO-Coordinator software 214 may instruct the TCF software 208 to return the stored response information to the client computer 102.

In some embodiments, a software component in the application software 215 may be modified in order to allow the software component to participate in a transaction by adding wrapper code to the software component. For example, an EJB component 271 in the application tier may be written according to the EJB specification, where the EJB component does not originally include code for participate in a transaction. In this case, a small amount of wrapper code may be added to the EJB component 271 to allow the EJB component 271 to participate in the transaction, e.g., so that the EJB component 271 can be registered with the 2PC transaction manager software 217 as a participant. The wrapper code may also intercept changes that the EJB component 271 makes to state information and direct the changes to a respective portion of change information. The wrapper code may also communicate with the XO-Coordinator software 214 and/or the 2PC transaction manager software 217 when the commit operation is performed, e.g., to commit the change information for the EJB component 271 when the transaction is committed.

In some embodiments, by implementing the transactions using wrapper code, an existing application may be easily modified to achieve the transactional functionality described above. For example, adding the wrapper code may require little or no change to the application logic. Also, in some embodiments the system may provide one or more software tools operable to partially or fully automate the addition of wrapper code to existing software components in order to allow the software components to participate in a transaction. For example, for a session bean component, a software tool may automatically identify call sites where the session bean is exposed in event listeners and automate source transformation to insert wrapper code around the session bean. In one embodiment, an Annotation facility such as provided in Java 5.0 may be utilized in adding wrapper code to stateful session beans.

Figure 5:
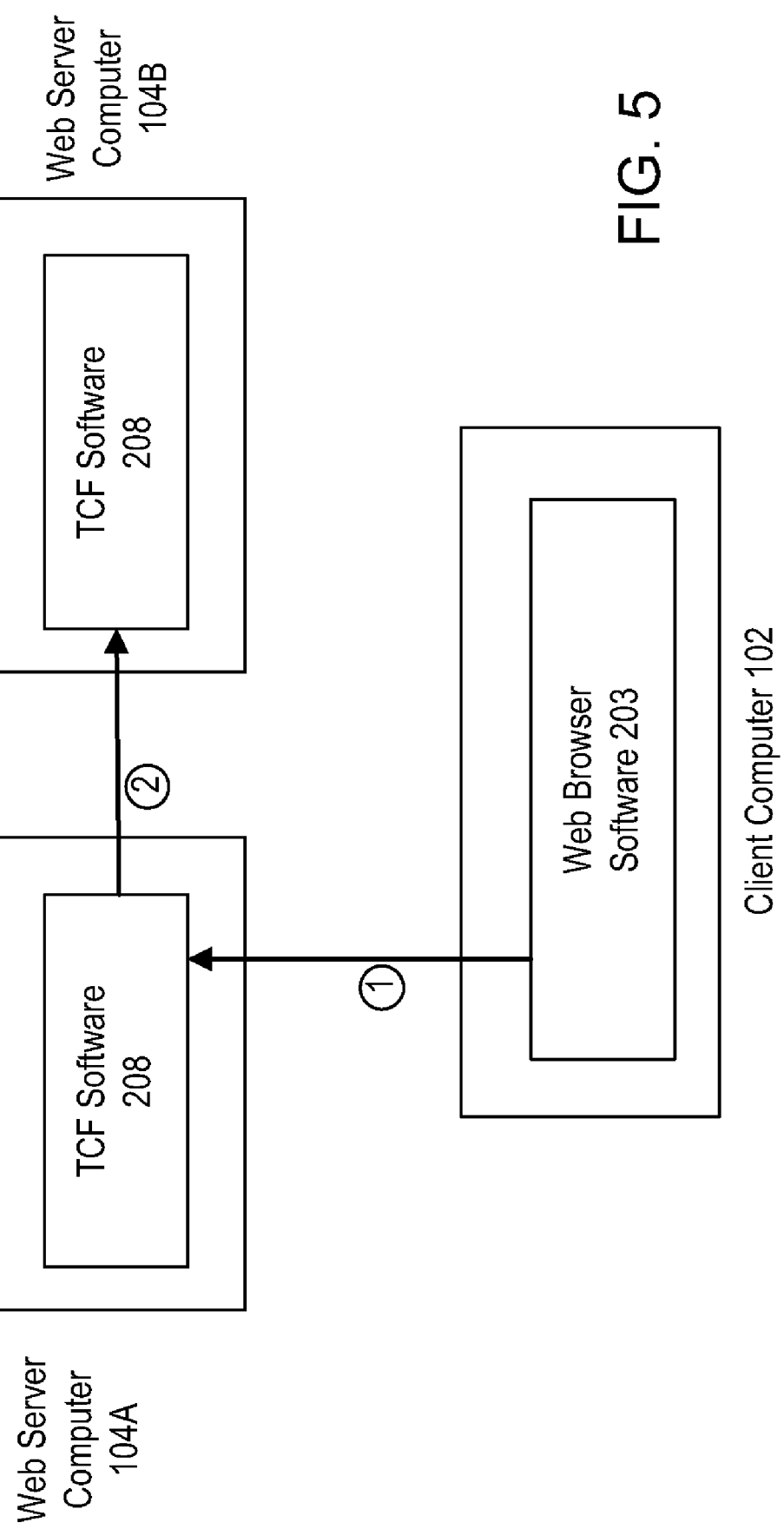
FIG. 5 illustrates operation of the TCF software that operates on the web server computers.

FIG. 5 illustrates operation of the TCF software 208 that operates on the web server computers 104 according to some embodiments. As indicated by arrow 1, a request comprising one or more TCP packets is sent from the web browser software 203 on the client computer 102 to the web server computer 104A. The TCF software 208 on the web server computer 104A may listen on a port, e.g., port 80 or other port, to receive the TCP packets and may forward the request to transaction management software 211 on an application server computer 106. As indicated by arrow 2, the TCF software 208 on the web server computer 104A may also forward the TCP packets to the TCF software 208 on the web server computer 104B. The TCF software 208 on the web server computer 104B may store the TCP packets on the web server computer 104B.

If the web server computer 104A fails when processing the request, the TCP connection may be transparently failed over to the web server computer 104B, as described above. For example, the web server computer 104B may assume a virtual IP address used for the TCP connection or utilize other information specified by the stored TCP packets to take over the TCP connection.

In some embodiments the TCF software 208 on the web server computer 104A may also generate an ID value identifying the request when the request is received from the client computer 102. For example, where the request comprises an HTTP request sent using TCP packets, the TCF software 208 on the web server computer 104A may add the request ID to a header of the HTTP request or into an HTTP cookie before forwarding the request to an application server computer 106. When a response is received from the application server computer 106, the request ID may be stripped from the response transmitting the response to the client computer 102.

FIGS. 6-10 illustrate en example of a failure scenario where a web server computer 104 fails when a request is being processed. For example, the web server computer 104A may receive a client request and forward the request to the application server computers 106A and 106B. In another embodiment the web server computer 104A may only forward the request to the application server computer 106A, and the application server computer 106A may then forward the request to the application server computer 106B.

Figure 6:
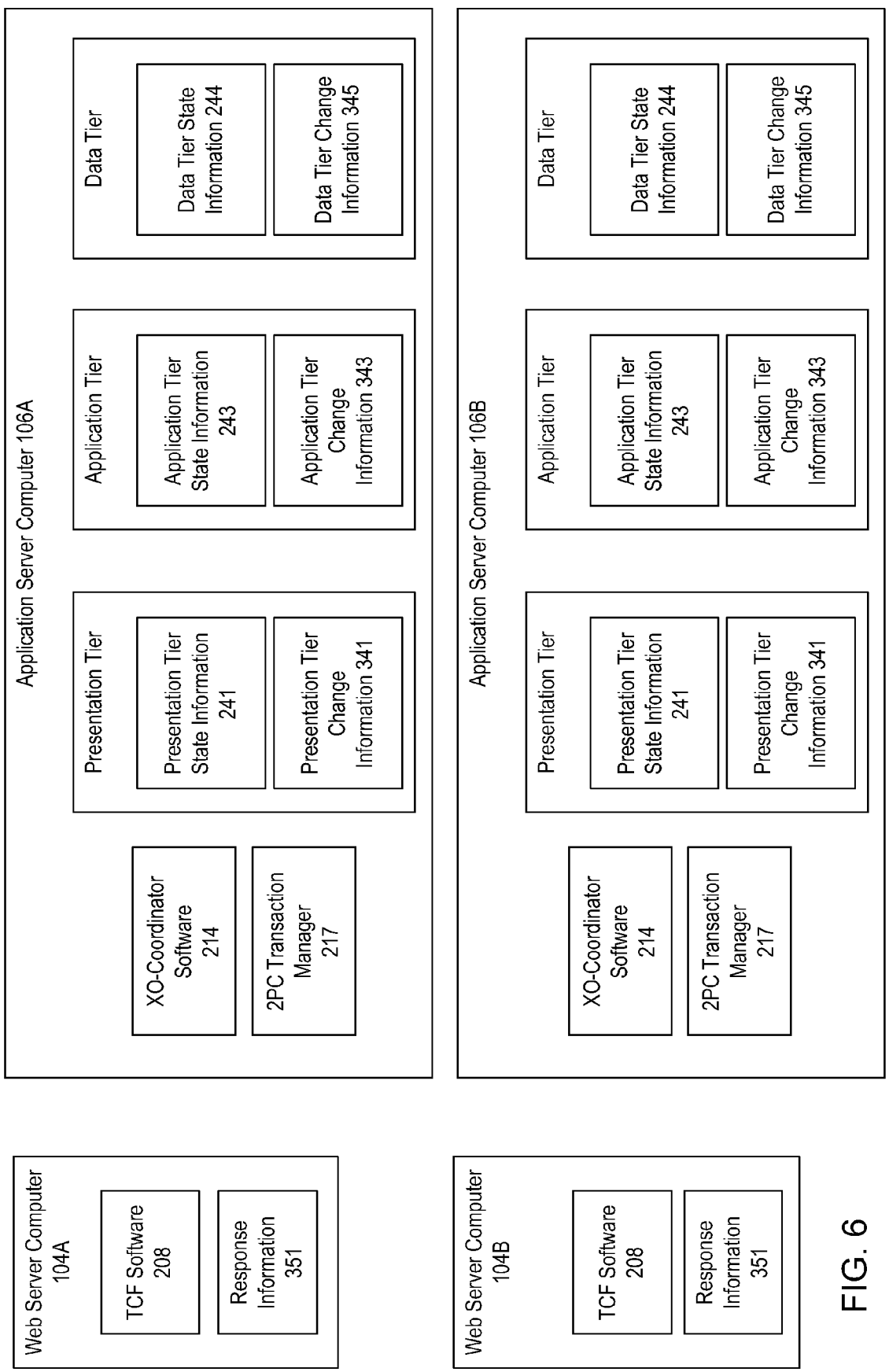
FIGS. 6-10 illustrate en example of a failure scenario where a web server computer fails when a request is being processed.

FIG. 6 illustrates a state of the web server computers 104 and the application server computers 106 after the request has been partially processed but before the commit operation has been performed. On each of the application server computer 106, the application software 215 has generated presentation tier change information 341 corresponding to the presentation tier state information 241, application tier change information 343 corresponding to the application tier state information 243, and data tier change information 345 corresponding to the data tier state information 245. Also, response information 351 generated by the application software 215 has been stored on each web server computer 104.

Figure 7:
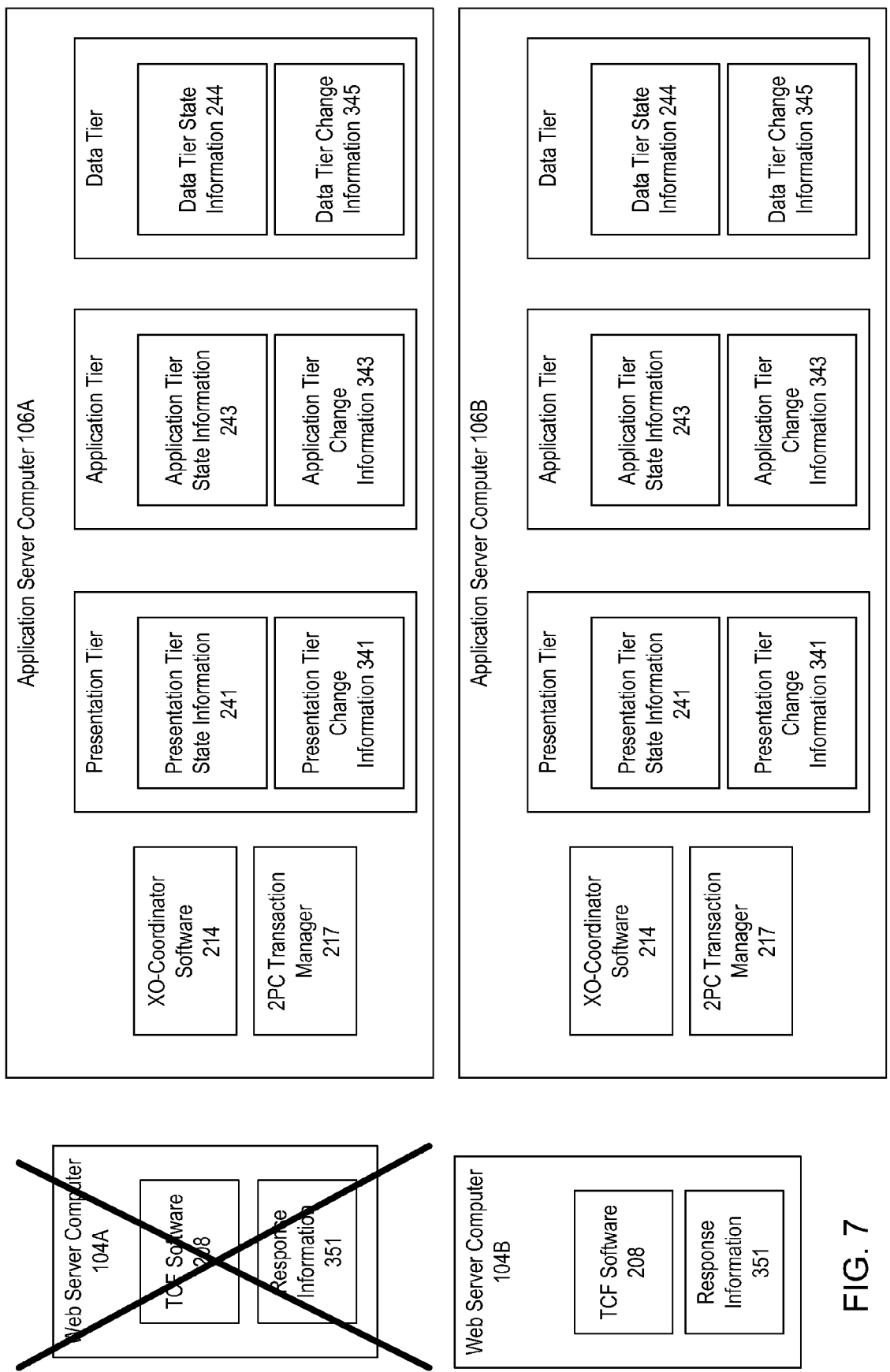
Figure 8:
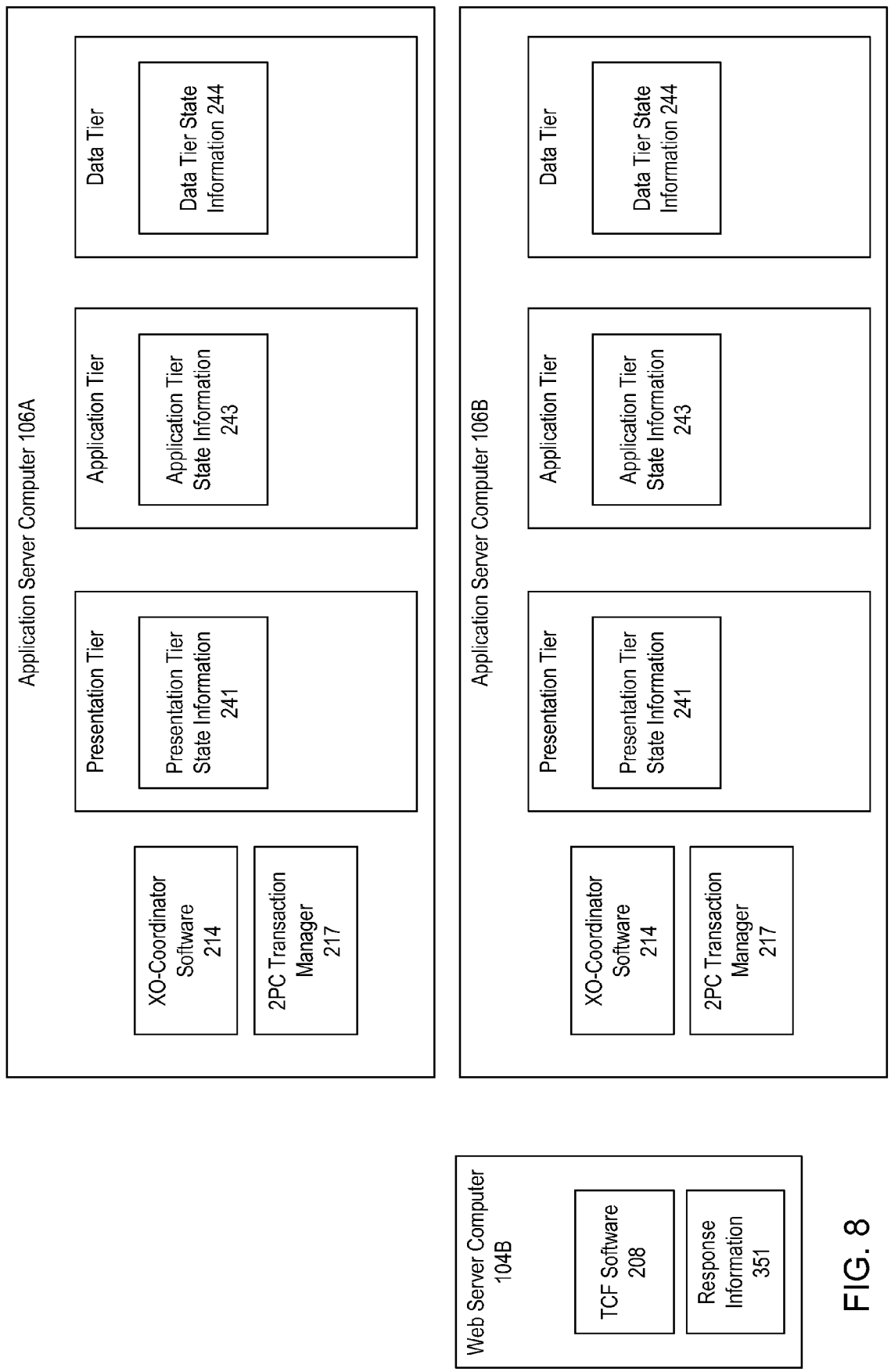

In this example, the web server computer 104A fails before the transaction for the request is committed, as shown in FIG. 7. Thus, the XO-Coordinator software 214 on the web server computer 104A may cause the transaction to be aborted. For example, the XO-Coordinator software 214 may communicate with the various participants in the transaction to instruct them to discard the presentation tier change information 341, application tier change information 343, data tier change information 345, and response information 351. As shown in FIG. 8, this information has been discarded on each of the server computers.

Figure 9:
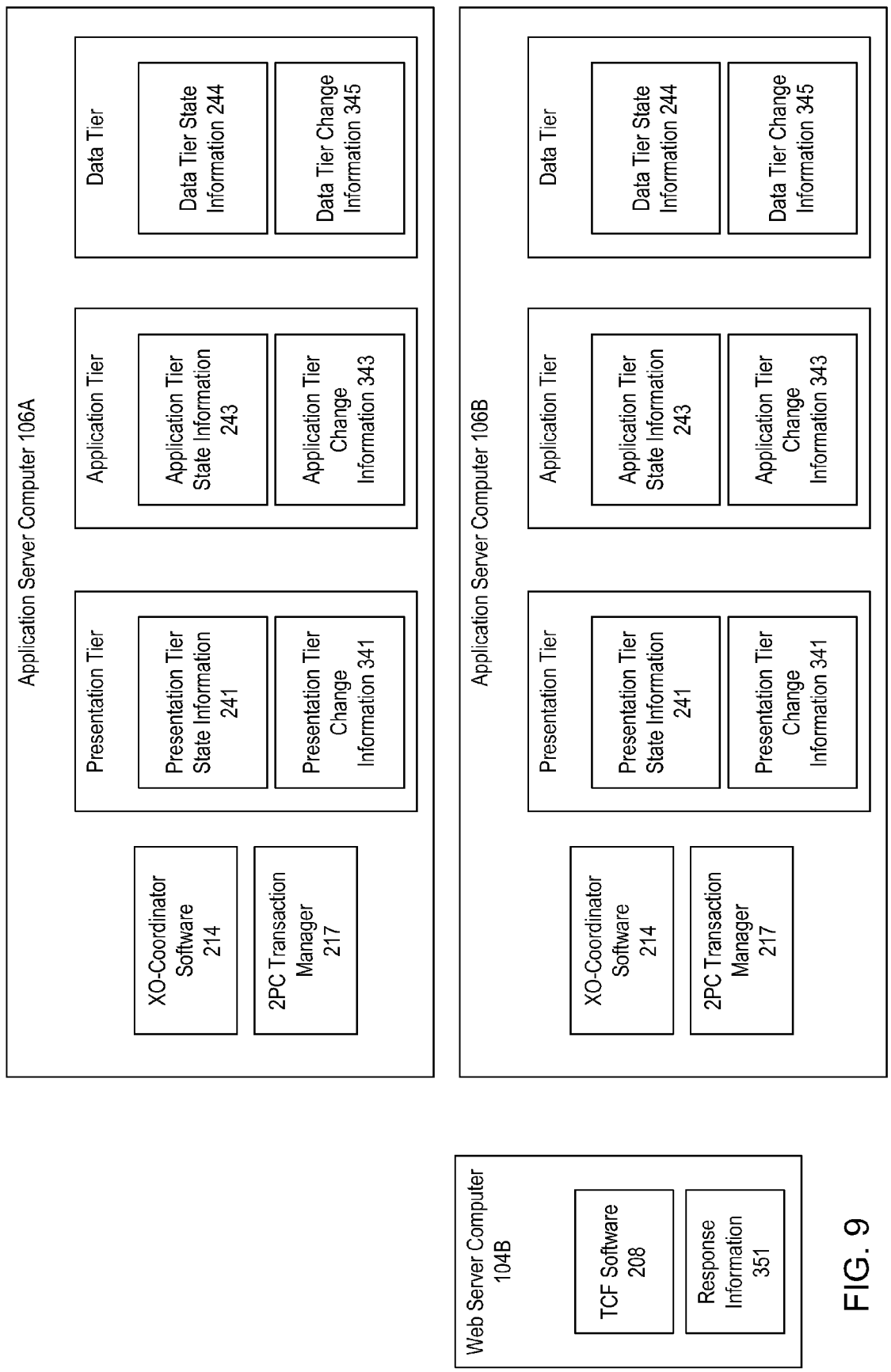
Figure 10:
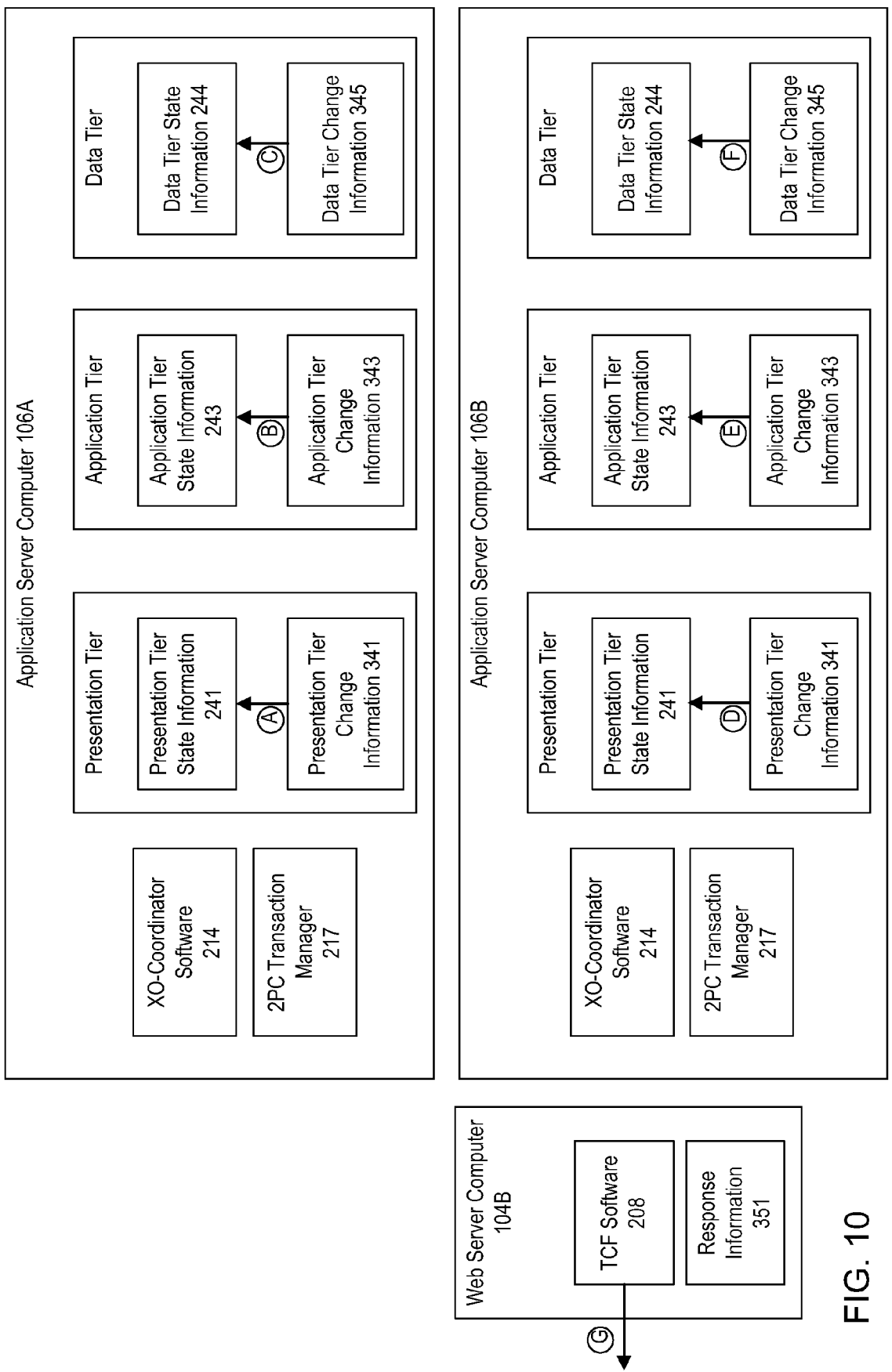

In response to the failure of the web server computer 104A, the TCP connection may be transparently failed over to the web server computer 104B. The web server computer 104B may then utilize the stored TCP packets to re-submit the request to the application server computers 106. Processing the request may result in a state similar to when the request was previously processed, as shown in FIG. 9. The XO-Coordinator software 214 may then attempt to commit the transaction. If the commit operation is successful then on each application server computer 106, the presentation tier change information 341 may be applied to the presentation tier state information 241, the application tier change information 343 may be applied to the application tier state information 243, and the data tier change information 345 may be applied to the data tier state information 245, as indicated by the arrows A, B, C, D, E, and F. Also, a response including the response information 351 may be sent by the web server computer 104B to the client computer 102, as indicated by the arrow G. The actions performed in arrows A-G may be performed atomically.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:

a first set of one or more server computers operable to execute a first instance of request management software, a first instance of transaction management software, and a first instance of application software;

wherein the first instance of request management software is executable to receive a request from a client computer and forward the request to the first instance of transaction management software;

wherein the first instance of transaction management software is executable to coordinate a transaction in response to the request, wherein coordinating the transaction comprises:

forwarding the request to the first instance of application software, wherein the first instance of application software includes a first plurality of executable software components which each maintain a respective portion of state information, wherein each of the software components is executable to store a respective portion of change information in response to the request; and initiate a commit operation according to a commit protocol, wherein the first plurality of software components and the first instance of request management software act as participants in the commit operation, wherein the commit protocol enables the first plurality of software components to attempt to atomically commit their respective portions of change information to their corresponding portions of state information and enables the first instance of request management software to perform a selected action depending upon whether the portions of change information are successfully committed.

2. The system of claim 1, wherein the system further comprises a second set of one or more server computers operable to execute a second instance of the request management software;

wherein said receiving the request from the client computer comprises receiving one or more packets associated with a network connection;

wherein the first instance of request management software is executable to forward the packets associated with the network connection to the second instance of request management software on the second set of one or more server computers, wherein the second instance of request management software is executable to log the packets.

3. The system of claim 2,
wherein in the event of a failure of the network connection, the second instance of request management software on the second set of one or more server computers is executable to:
detect the failure;
take over the network connection in response to the failure, wherein taking over the network connection comprises returning a response to the client computer via the network connection.

4. The system of claim 3,
wherein the network connection comprises a TCP connection, wherein said taking over the network connection comprises taking over the TCP connection.

5. The system of claim 3,
wherein the second instance of request management software is further executable to:
initiate re-processing of the request using the logged packets in response to the failure;
receive response information in response to the re-processing of the request;
wherein returning the response to the client computer comprises returning the response information.

6. The system of claim 5,
wherein said initiating re-processing of the request comprises initiating re-processing of the request on the first set of one or more server computers.

7. The system of claim 5,
wherein said initiating re-processing of the request comprises initiating re-processing of the request on the second set of one or more server computers.

8. The system of claim 1,
wherein said first instance of request management software performing a selected action depending upon whether the portions of change information are successfully committed comprises the first instance of request management software returning a response to the client computer indicating that the request was successful in the event that the portions of change information are successfully committed.

9. The system of claim 8,
wherein the first instance of application software is further executable to return response information to the first instance of request management software in response to the request;
wherein said returning the response to the client computer indicating that the request was successful comprises returning the response information.

10. The system of claim 1,
wherein said first instance of request management software performing a selected action depending upon whether the portions of change information are successfully committed comprises the first instance of request management software initiating re-processing of the request in the event that the portions of change information are not successfully committed.

11. The system of claim 1,
wherein the first set of one or more server computers comprises a first web server computer and a first one or more application server computers;
wherein the first instance of request management software executes on the first web server computer;
wherein the first instance of transaction management software and the first instance of application software execute on the first one or more application server computers.

12. The system of claim 1,
wherein the application software is implemented according to an N-tier architecture;
wherein the first plurality of software components include a first one or more software components in a first tier and a second one or more software components in a second tier.

13. The system of claim 1,
wherein the application software is implemented according to a 3-tier architecture that includes a presentation tier, an application tier, and a data tier;
wherein the first plurality of software components include a first one or more software components in the presentation tier, a second one or more software components in the application tier, and a third one or more software components in the data tier.

14. The system of claim 13,
wherein the third one or more software components in the data tier implement a database.

15. The system of claim 1, further comprising:
a second set of one or more server computers operable to execute a second instance of the application software;
wherein coordinating the transaction further comprises forwarding the request to the second instance of application software on the second set of one or more server computers, wherein the second instance of application software includes a second plurality of executable software components which each maintain a respective portion of state information, wherein each of the second plurality of software components is executable to store a respective portion of change information in response to the request;
wherein the second plurality of software components also act as participants in the commit operation, wherein the commit protocol enables the first plurality of software components on the first set of one or more server computers and the second plurality of software components on the second set of one or more server computers to attempt to atomically commit their respective portions of change information to their corresponding portions of state information.

16. The system of claim 1,
wherein the first instance of transaction management software includes first transaction coordinator software and first transaction manager software;
wherein the first transaction coordinator software is operable to perform said forwarding the request to the first instance of application software;
wherein the first transaction manager software is operable to perform said initiating the commit operation.

17. The system of claim 16,
wherein the first transaction coordinator software is operable to communicate with the first transaction manager software to initiate the transaction before said forwarding the request to the first instance of application software.

18. The system of claim 1,
wherein the commit protocol comprises a two-phase commit (2PC) protocol;
wherein the 2PC protocol enables the first plurality of software components to attempt to atomically commit their respective portions of change information to their corresponding portions of state information.

19. The system of claim 1,
wherein the first instance of application software is implemented according to the Java 2 Platform, Enterprise Edition (J2EE);

wherein one or more of the first plurality of software components comprise Enterprise JavaBean (EJB) components.

20. The system of claim 1,
wherein each of the first plurality of software components includes wrapper code enabling the software component to act as a participant in the commit operation.

21. A computer-implemented method comprising:

a first set of one or more server computers executing a first instance of request management software, a first instance of transaction management software, and a first instance of application software;

wherein the first instance of request management software receives a request from a client computer and forwards the request to the first instance of transaction management software;

wherein the first instance of transaction management software coordinates a transaction in response to the request, wherein coordinating the transaction comprises:

forwarding the request to the first instance of application software, wherein the first instance of application software includes a first plurality of executable software components which each maintain a respective portion of state information, wherein each of the software components stores a respective portion of change information in response to the request; and initiating a commit operation according to a commit protocol, wherein the first plurality of software components and the first instance of request management software act as participants in the commit operation, wherein the commit protocol enables the first plurality of software components to attempt to atomically commit their respective portions of change information to their corresponding portions of state information and enables the first instance of request management software to perform a selected action depending upon whether the portions of change information are successfully committed.

* * * * *